United States Patent
Zeng et al.

(10) Patent No.: US 9,507,961 B2
(45) Date of Patent: Nov. 29, 2016

(54) SYSTEM AND METHOD FOR PROVIDING SECURE ACCESS CONTROL TO A GRAPHICS PROCESSING UNIT

(71) Applicant: Qualcomm Incorporated, San Diego, CA (US)

(72) Inventors: Thomas Zeng, San Diego, CA (US); Azzedine Touzni, San Diego, CA (US); William Torzewski, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 308 days.

(21) Appl. No.: 14/014,032

(22) Filed: Aug. 29, 2013

(65) Prior Publication Data
US 2015/0002523 A1    Jan. 1, 2015

Related U.S. Application Data

(60) Provisional application No. 61/841,881, filed on Jul. 1, 2013.

(51) Int. Cl.
 *G06F 21/74* (2013.01)
 *G06F 21/71* (2013.01)
 *G06T 1/20* (2006.01)

(52) U.S. Cl.
 CPC ............... *G06F 21/71* (2013.01); *G06F 21/74* (2013.01); *G06T 1/20* (2013.01); *G06F 2221/2113* (2013.01)

(58) Field of Classification Search
 CPC .................................. G06F 21/74; G06T 1/20
 USPC ............................................................ 345/522
 See application file for complete search history.

(56) References Cited

U.S. PATENT DOCUMENTS

2006/0095793 A1\* 5/2006 Hall .................... G06F 12/145
    713/190
2008/0303837 A1\* 12/2008 Swift .................... G06F 9/5044
    345/541

(Continued)

FOREIGN PATENT DOCUMENTS

| EP | 1637960 A2 | 3/2006 |
| EP | 2560097 A2 | 2/2013 |
| EP | 2562643 A2 | 2/2013 |

OTHER PUBLICATIONS

International Search Report and Written Opinion—PCT/US2014/044776—ISA/EPO—Oct. 1, 2014.

*Primary Examiner* — Ryan D McCulley
(74) *Attorney, Agent, or Firm* — Smith Tempel

(57) ABSTRACT

Systems, methods, and computer programs are disclosed for providing secure access control to a graphics processing unit (GPU). One system includes a GPU, a plurality GPU programming interfaces, and a command processor. Each GPU programming interface is dynamically assigned to a different one of a plurality of security zones. Each GPU programming interface is configured to receive work orders issued by one or more applications associated with the corresponding security zone. The work orders comprise instructions to be executed by the GPU. The command processor is in communication with the plurality of GPU programming interfaces. The command processor is configured to control execution of the work orders received by the plurality of GPU programming interfaces using separate secure memory regions. Each secure memory region is allocated to one of the plurality of security zones.

36 Claims, 4 Drawing Sheets

(56) References Cited

U.S. PATENT DOCUMENTS

| | | | |
|---|---|---|---|
| 2010/0031342 A1* | 2/2010 | Vogsland | 726/17 |
| 2011/0265183 A1* | 10/2011 | Wu et al. | 726/24 |
| 2012/0237029 A1 | 9/2012 | Nason et al. | |
| 2012/0283008 A1 | 11/2012 | Martone | |
| 2013/0132735 A1* | 5/2013 | Kottilingal | G06F 21/6218 713/189 |
| 2013/0275701 A1* | 10/2013 | Symes | G06F 12/145 711/163 |
| 2013/0276096 A1* | 10/2013 | Symes | G06F 21/74 726/16 |
| 2014/0237609 A1* | 8/2014 | Sharp | G06F 21/53 726/26 |

\* cited by examiner

SYSTEM AND METHOD FOR PROVIDING SECURE ACCESS CONTROL TO A GRAPHICS PROCESSING UNIT

PRIORITY AND RELATED APPLICATIONS STATEMENT

This application claims priority under 35 U.S.C. 119(e) to U.S. Provisional Patent Application filed on Jul. 1, 2013, assigned Provisional Application Ser. No. 61/841,881, and entitled "System and Method for Providing Secure Access Control to a Graphics Processing Unit," the entire contents of which is hereby incorporated by reference.

DESCRIPTION OF THE RELATED ART

Portable computing devices ("PCDs"), such as mobile phones, are getting more complex. Existing PCDs frequently have a number of processors (e.g., central processing unit (CPU), graphics processing unit (GPU), digital signal processors (DSP), etc.) to perform different functionality and meet the increasing demands for such devices. Existing PCDs may also support content protection architectures, which generally support access control requirements for use cases, such as, digital rights management (DRM), controlling access to confidential data for applications including banking, medical records, fingerprints, etc. A content protection architecture typically separates memory regions into different security zones for controlling access by applications to sensitive content. Existing PCDs and content protection architectures are limited, however, to CPU-level access control.

Thus, there is a need in the art for improved mechanisms for providing secure access control to a GPU.

SUMMARY OF THE DISCLOSURE

Systems, methods, and computer programs are disclosed for providing secure access control to a graphics processing unit (GPU). One method comprises: defining a plurality of security zones for controlling access to a graphics processing unit (GPU); assigning each of the security zones to a corresponding one of a plurality of GPU programming interfaces provided by the GPU, each of the GPU programming interfaces for receiving work orders issued by one or more applications associated with the corresponding security zone, the work orders comprising instructions to be executed by the GPU; and controlling execution of the work orders received by the plurality of GPU programming interfaces using separate secure memory regions, each secure memory region allocated to one of the plurality of security zones.

Another embodiment is a computer program for providing secure access control to a graphics processing unit. The computer program is embodied in a computer-readable medium for execution by a processor. The computer program comprises logic configured to: define a plurality of security zones for controlling access to a graphics processing unit (GPU); assign each of the security zones to a corresponding one of a plurality of GPU programming interfaces provided by the GPU, each of the GPU programming interfaces for receiving work orders issued by one or more applications associated with the corresponding security zone, the work orders comprising instructions to be executed by the GPU; and control execution of the work orders received by the plurality of GPU programming interfaces using separate secure memory regions, each secure memory region allocated to one of the plurality of security zones.

Another embodiment is a system for providing secure access control to a graphics processing unit (GPU). The system comprises a GPU having a plurality of GPU programming interfaces and a command processor. Each GPU programming interface is dynamically assigned to a different one of a plurality of security zones and configured to receive work orders issued by one or more applications associated with the corresponding security zone. The work orders comprise instructions to be executed by the GPU. The command processor is in communication with the plurality of GPU programming interfaces and configured to control execution of the work orders received by the plurality of GPU programming interfaces using separate secure memory regions. Each secure memory region allocated to one of the plurality of security zones.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application or module running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

A "portable computing device" ("PCD") may comprise, for example, a cellular telephone, a satellite telephone, a pager, a personal digital assistant, a smart phone, a navigation device, a smart book or electronic reader, a media player, a tablet computer, a laptop computer, or other such devices.

Figure 1:
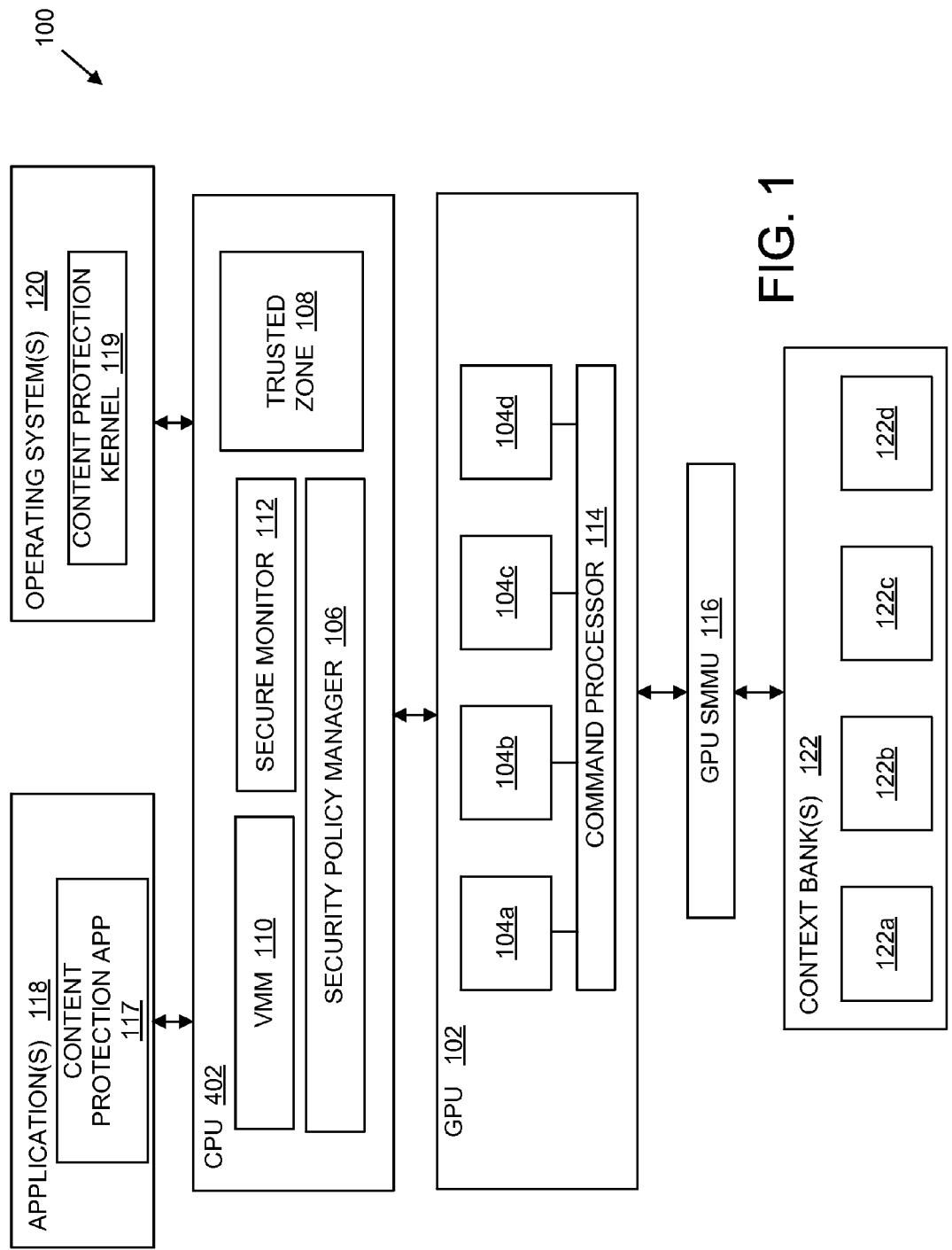
FIG. 1 is a block diagram illustrating an embodiment of a system for providing secure access control to a graphics processing unit (GPU).

FIG. 1 is a system 100 that may be incorporated in, for example, a PCD (FIG. 4) for providing secure access control to a graphics processing unit (GPU) 102. System 100 comprises one or more central processing units (CPU) 402 and one or more GPUs 102 for executing graphics and/or compute instructions associated with one or more applications 118 and/or one or more operating systems 120. The CPU 402 and GPU 102 may be connected by a hardware bus, connection, or other interface. The system 100 provides GPU access control with a plurality of security and/or content protection zones ("security zones").

GPU hardware and/or software provides a plurality of GPU programming interfaces 104 to CPU 402. Each of the GPU programming interfaces 104 is associated with a different security zone for receiving work orders issued by the one or more applications 118 and operating systems 120 residing in different security zones. The security zones may be defined by a security policy manager 106 based on any desirable security use case. Each security zone is assigned to a separate GPU programming interface 104 and allocated to a separate memory region. In the embodiment of FIG. 1, the system 100 comprises four GPU programming interfaces 104a, 104b, 104c, and 104d with corresponding secure memory regions. Context banks 122a, 122b, 122c, and 122d may be allocated as memory resources for executing the work orders in the corresponding security zones. In this regard, the secure memory regions may comprise an isolated address space with hardware-enforced protections using context banks 122a, 122b, 122c, and 122d in a system memory management unit (SMMU) 116. Each context bank 122 may comprise hardware resources to enforce a specific secure and isolated address space.

The work orders comprise graphics instructions to be executed by the GPU 102. It should be appreciated that the applications 118 may comprise any suitable application requesting resources from the GPU 102. The operating systems 120 may comprise one or more operating systems, such as, for example, a high-level operating system (HLOS). In an embodiment, the GPU 102 may receive work orders from specially-configured content protection applications (e.g., a content protection application 117 or a content protection kernel 119 associated with the operating systems 120).

One of ordinary skill in the art will appreciate that a GPU programming interface 104 comprises a control resource. In an embodiment, the control resource may comprise register resources for accepting the work orders from the applications in the corresponding security zone and one or more interrupt resources to indicate the completion or failure status of the execution of a work order. The GPU programming interfaces 104 may be configurable by a virtual machine manager (VMM) 110 based on, for instance, the sizing of virtual machines and whether the security policy manager 106 or a trusted zone component 108 (i.e., a "root of trust" in the system 100) needs access to the GPU 402. The "root of trust" in the system 100 dynamically assigns the GPU programming interfaces 104 to the designated security zones based on the system security policies of the security policy manager 106, which may occur at a secure use case startup time.

As mentioned above, each GPU programming interface 104 may be memory mapped to a corresponding context bank 122 depending on the particular use scenario, in which case they may comprise a memory mapped input/output (MIMO) register. The GPU programming interfaces 104 may be directly assignable to one or more virtual machines or the VMM 110. It should be further appreciated that each GPU programming interface 104 may be protected by hardware-enforced access control using a system memory management unit (SMMU) 116. In this manner, each security zone may have complete control over the register and interrupt resources associated with the GPU programming interface 104 after a particular use case has started.

As further illustrated in FIG. 1, the GPU 102 may include a command processor 114 in communication with the plurality of GPU programming interfaces 104. The command processor 114 may be configured to select work orders from a content queue 204 (FIG. 2) associated with the GPU programming interface 104. In this regard, the command processor 114 may determine which work orders to process based on, for example, GPU scheduling policies, and then control execution of the work orders using the appropriate context bank 122 allocated to the security zone.

It should be appreciated that, in an embodiment, multiple security zones can be managed in parallel by the applications 118 running concurrently on the CPU 402. Each application 118 may directly manage an associated command queue. One or more of the security zones may also be secure and/or non-secure. The security policy under which an application 118 (and its associated memory) is secure and/or non-secure may determined by a processor (e.g., CPU 408) controlling the GPU 102. It should be further appreciated that the segmentation performed and/or managed by the CPU 402 may be implemented in various ways, including, for example, the following exemplary ways: (1) isolation with a hypervisor layer (e.g., a software layer to manage multiple guest operating systems 120); and/or (2) a hardware process construct defining a hardware secure domain (e.g., "trustzone" security extensions used in ARM architectures) which may control separation between trusted and untrusted hardware via additional hardware tagging of instructions to track memory access and GPU commands and isolate the source of the request. The hypervisor layer may comprise a software abstraction on the hardware, which may be limited to memory access isolation of the control unit.

The system 101 may support any desirable security use cases related to GPU access control. For example, the system 101 may support uses case, such as, digital rights management (DRM) and controlling access to confidential data for applications including banking, medical records, fingerprints, etc., to name a few. In an embodiment, the system 101 may provide four exception levels associated with respective security zones, with each level having different or ranked security privileges. A first exception level (EL0) may loosely correspond to a user mode. A second exception level (EL1) may correspond to a kernel mode. A third exception level (EL2) may correspond to hypervisors. A fourth exception level (EL3) may correspond to the trusted zone component 108, which comprises the most privileged security zone.

Figure 2:
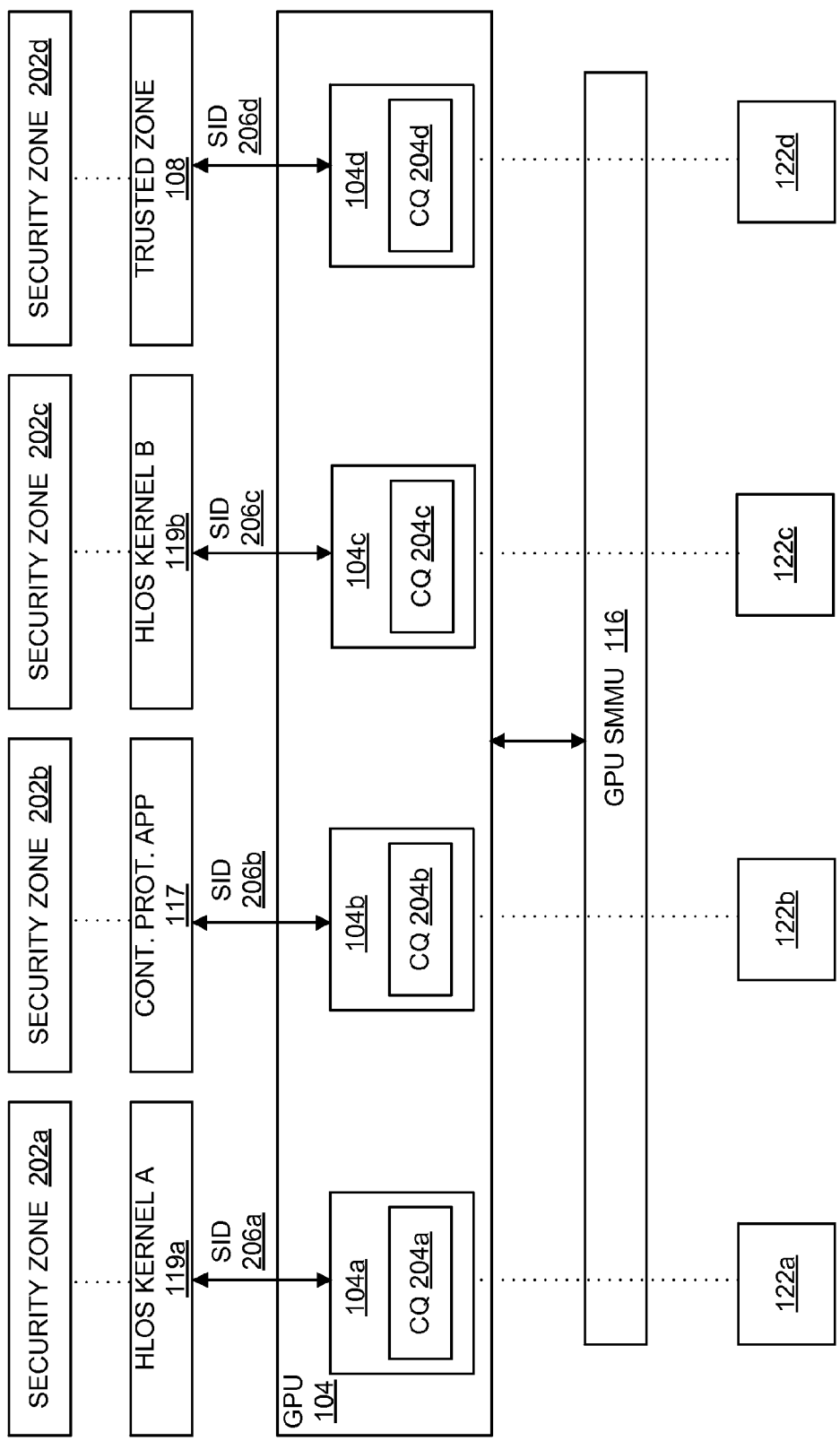
FIG. 2 is a block diagram illustrating an embodiment of the system of FIG. 1 configured with four security zones and corresponding GPU programming interfaces and allocated memory regions.

FIG. 2 illustrates an exemplary use case involving four security zones 202a, 202b, 202c, and 202d. The security zone 202a is assigned to a GPU programming interface 104a configured for a first HLOS kernel 119a and having a content queue 204a. The content bank 122a is allocated to the security zone 202a. The security zone 202b is assigned to a GPU programming interface 104b configured for a content protection application 117 and having a content queue 204b. The context bank 122b is allocated to the security zone 202b. The security zone 202c is assigned to a GPU programming interface 104c configured for a second HLOS kernel 119b and having a content queue 204c. The context bank 122c is allocated to the security zone 202c. The security zone 202d is assigned to a GPU programming interface 104c associated with the trusted zone component 108 and having a content queue 204d. The trusted zone component 108 owns a trusted context bank 122d, which comprises an isolated address space that is only visible to the trusted zone component 108.

It should be appreciated that the security zones 202 may support any desirable use cases with appropriate applications 118. For example, in an embodiment, the security zone 202a may be associated with a gaming application and an associated virtual memory space. Security zone 202b may be associated with a video application and an associated premium video virtual memory space. Security zone 202c may be associated with a browser application and an associated virtual memory space. Security zone 202d may be associated with a banking application and an associated virtual memory space.

As further illustrated in FIG. 2, each GPU programming interface 104a, 104b, 104c, and 104d may be identified by a separate data stream identifier (SID 206a, SID 206b, SID 206c, and SID 206d, respectively). It should be appreciated that the stream identifiers may be used, for example, by the CPU 402 to inject the work orders to the appropriate GPU programming interface. The command processor 114 may select work orders according to stream identifiers, and the SMMU 116 may manage memory resources according to the stream identifiers.

Figure 3:
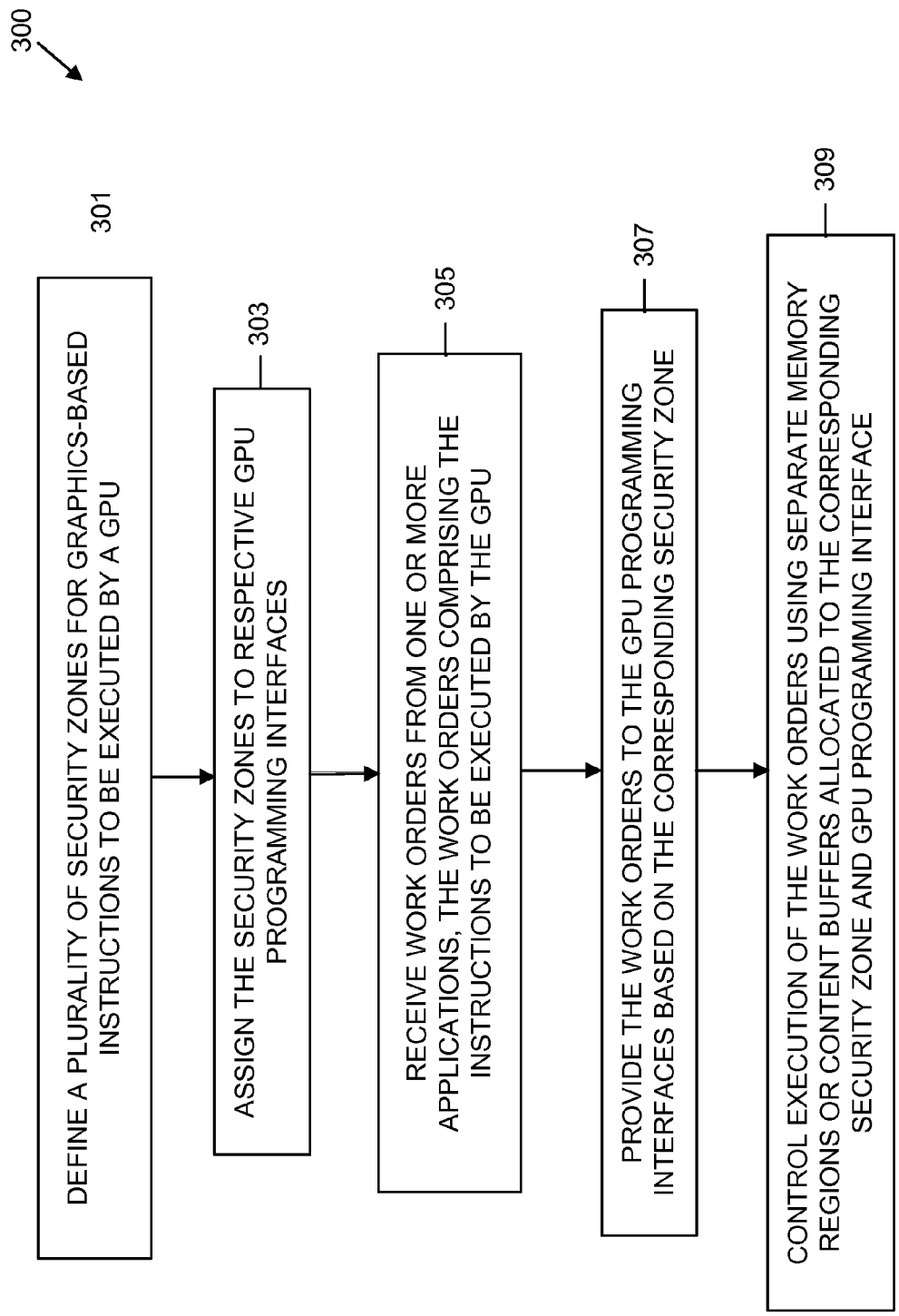
FIG. 3 is a flowchart illustrating an embodiment of a method implemented in the system of FIG. 1 for providing secure access control to the GPU.

FIG. 3 illustrates an embodiment of a method 300 for providing GPU access control in the system 100. At block 301, a plurality of security zones 202 are defined for instructions to be executed by the GPU 104. The security zones 202 may be defined by the security policy manager 106, the trusted zone component 108, or other software and/or hardware associated with system 101. In an embodiment, two or more of the security zones 202 may be managed in parallel. Furthermore, it should be appreciated that, in some embodiments, both secure and non-secure zones may be implemented. At block 303, each security zone 202 is assigned to a separate GPU programming interface 104 and allocated to a separate memory region (e.g., context banks 122a, 122b, 122c, and 122d). As mentioned above, the GPU programming interfaces 104 may be configurable by VMM 110 based on, for instance, the sizing of virtual machines and whether the security policy manager 106 or the trusted zone component 108 needs access to the GPU 104. In an embodiment, the "root of trust" in the system 100 dynamically assigns the GPU programming interfaces 104 to the designated security zones based on the system security policies of the security policy manager 106, which may occur at a secure use case startup time. At block 305, the applications 118 residing in one of the security zones 202 may issue work orders to the appropriate GPU programming interface 104. The CPU 402 may inject the work orders using stream identifiers 206. At block 307, the work orders may be provided to the appropriate GPU programming interface 105 based on the corresponding security zone 202. At block 309, the command processor 114 and/or the SMMU 116 may control execution of the work orders using separate memory regions (e.g., context banks 122a, 122b, 122c, and 122d) allocated to the corresponding security zone 202 and GPU programming interface 104.

One of ordinary skill in the art will appreciate that alternative use cases may be implemented. An exemplary "trusted zone" use case involving the trusted zone component 108 will be described to further illustrate certain aspects of the GPU access control functionality. The trusted zone component 108 may claim ownership of the trusted context bank 122d (FIG. 2). A page table associated with a SMMU context bank may be configured. The page table may be populated with buffers owned by the trusted zone (i.e., security zone 202d) and which are not visible to any other components with the exception of buffers shared with another security zone 202a, 202b, or 202c. A security policy may specify that the trusted zone component 108 claim the ownership of the GPU programming interface 104d. The SID 206d may be configured as a secure SID that maps to the trusted context bank 122d. In operation, the trusted zone component 108 issues GPU work orders by injecting the requests to the command queue 204d.

When the work orders are injected in the command queue 204d, the command processor 114 may be prompted (e.g., by a "doorbell" register) to begin processing. The command processor 114 scans the GPU programming interface(s) 104d to select which one to work on. The work order may be processed while the SID 206d is set according to the GPU programming interface 104d. The SID 206d selects the specific context bank which sets up the appropriate memory protection. When the work is completed successfully or in the case of an error, the command processor 114 interrupts the CPU 402 and/or the trusted zone component 108 receives the interrupt. After completion of the work order, the trusted zone component 108 may issue further work orders. If the interrupt indicates an error, the trusted zone component 108 may stop further processing and handle the error according to error handling policies.

Figure 4:
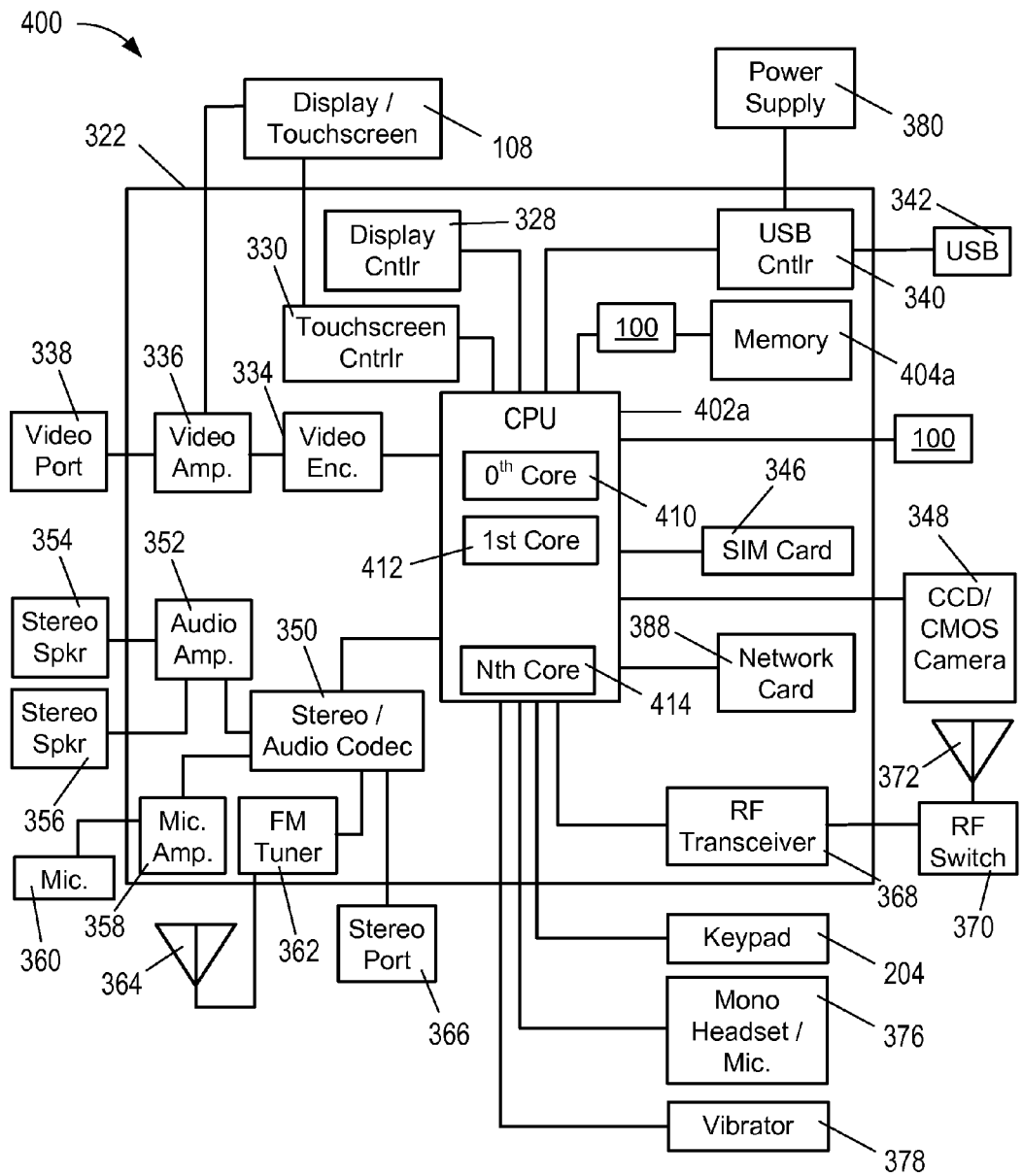
FIG. 4 is a block diagram illustrating an exemplary portable computing device for incorporating the system of FIG. 1.

FIG. 4 illustrates the system 100 described above incorporated in an exemplary portable computing device (PCD) 400. It should be appreciated that some components of system 100 are included on the SoC 322 while others may reside off-chip. The SoC 322 may comprise any embedded system that may be separately manufactured and incorporated into designs for the portable computing device 400.

As shown, the PCD 400 includes an SoC 322 that includes a multicore CPU 402A. The multicore CPU 402A may include a zeroth core 410, a first core 412, and an Nth core 414. A display controller 328 and a touch screen controller 330 may be coupled to the GPU 104, which may reside on or connected to the CPU 402. In turn, the touch screen display 108 external to the SoC 322 may be coupled to the display controller 328 and the touch screen controller 330.

FIG. 4 further shows that a video encoder 334, e.g., a phase alternating line (PAL) encoder, a sequential color a memoire (SECAM) encoder, or a national television system(s) committee (NTSC) encoder, is coupled to the multicore CPU 402A. Further, a video amplifier 336 is coupled to the video encoder 334 and the touch screen display 108. Also, a video port 338 is coupled to the video amplifier 336. As shown in FIG. 4, a universal serial bus (USB) controller 340 and other trace sinks 109 and trace dumps 110 may be coupled to the multicore CPU 402A. Also, a USB port 342 is coupled to the USB controller 340. Memory 404A and a subscriber identity module (SIM) card 346 may also be coupled to the multicore CPU 402A.

Further, as shown in FIG. 4, a digital camera 348 may be coupled to the multicore CPU 402A. In an exemplary aspect, the digital camera 348 is a charge-coupled device (CCD) camera or a complementary metal-oxide semiconductor (CMOS) camera.

As further illustrated in FIG. 4, a stereo audio coder-decoder (CODEC) 350 may be coupled to the multicore CPU 402A. Moreover, an audio amplifier 352 may coupled to the stereo audio CODEC 350. In an exemplary aspect, a first stereo speaker 354 and a second stereo speaker 356 are coupled to the audio amplifier 352. FIG. 4 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 4 further illustrates that a radio frequency (RF) transceiver 368 may be coupled to the multicore CPU 402A. An RF switch 370 may be coupled to the RF transceiver 368 and an RF antenna 372. As shown in FIG. 4, a keypad 204 may be coupled to the multicore CPU 402A. Also, a mono headset with a microphone 376 may be coupled to the multicore CPU 402A. Further, a vibrator device 378 may be coupled to the multicore CPU 402A.

FIG. 4 also shows that a power supply 380 may be coupled to the SoC 322. In a particular aspect, the power supply 380 is a direct current (DC) power supply that provides power to the various components of the PCD 400 that require power. Further, in a particular aspect, the power supply is a rechargeable DC battery or a DC power supply that is derived from an alternating current (AC) to DC transformer that is connected to an AC power source.

FIG. 4 further indicates that the PCD 400 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 4, the touch screen display 108, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

In a particular aspect, one or more of the method steps described herein may be stored in the memory 404A as computer program instructions, such as the modules described above in connection with the system 100 as illustrated in FIG. 1.

These instructions may be executed by the multicore CPU 402A and/or the GPU 102 to perform the methods described herein. Further, the multicore CPU 402A, the GPU 102, memory 404A of the PCD 400, or a combination thereof may serve as a means for executing one or more of the method steps described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

What is claimed is:

1. A method for providing secure access control to a graphics processing unit, the method comprising:
   defining a plurality of security zones for controlling access to a graphics processing unit (GPU) over a common communication channel, the GPU comprising a plurality of GPU programming interfaces;
   assigning each of the security zones to a corresponding one of the plurality of GPU programming interfaces of the GPU, each of the GPU programming interfaces having a separate content queue;
   sending a communication over the common communication channel from a central processing unit (CPU) to the GPU;
   receiving at a content queue of one of the plurality of GPU programming interfaces the communication from the CPU, the communication comprising work orders issued by one or more applications associated with the corresponding security zone, the work orders comprising instructions to be executed by the GPU;
   selecting the work orders received by the content queue of the one of the plurality of GPU programming interfaces for execution; and
   controlling execution of the work orders using separate secure memory regions, each secure memory region allocated to one of the security zones and one of the plurality of GPU programming interfaces.

2. The method of claim 1, wherein the work orders are injected by the CPU into the corresponding GPU programming interface according to the security zones.

3. The method of claim 2, wherein the work orders are injected using a stream identifier that identifies the corresponding GPU programming interface.

4. The method of claim 1, wherein the separate memory regions are allocated by a secure memory management unit.

5. The method of claim 4, wherein one or more of the separate memory regions comprise an isolated address space with hardware-enforced protections using an associated context bank in the secure memory management unit.

6. The method of claim 5, wherein the isolated address space is implemented via one or more of: a hypervisor software layer to manage two or more operating systems; and separation between trusted hardware and untrusted hardware.

7. The method of claim 1, wherein two or more of the security zones are managed in parallel.

8. The method of claim 1, wherein one or more of the security zones comprises a non-secure zone or a secure zone.

9. The method of claim 1, wherein the one or more applications issuing the work orders comprise one or more of a content protection zone application, a content protection zone kernel associated with an operating system, a high level operating system kernel, and a trusted zone security monitor.

10. A system for providing secure access control to a graphics processing unit, the method comprising:
    means for defining a plurality of security zones for controlling access to a graphics processing unit (GPU) over a common communication channel, the GPU comprising a plurality of GPU programming interfaces;
    means for assigning each of the security zones to a corresponding one of the plurality of GPU programming interfaces of the GPU, each of the GPU programming interfaces having a separate content queue;
    means for sending a communication over the common communication channel from a central processing unit (CPU) to the GPU;
    means for receiving at a content queue of one of the plurality of GPU programming interfaces the communication from the CPU, the communication comprising work orders issued by one or more applications associated with the corresponding security zone, the work orders comprising instructions to be executed by the GPU;
    means for selecting the work orders received by the content queue of the one of the plurality of GPU programming interfaces for execution; and
    means for controlling execution of the work using separate secure memory regions, each secure memory region allocated to one of the security zones and one of the plurality of GPU programming interfaces.

11. The system of claim 10, wherein the work orders are injected by the CPU into the corresponding GPU programming interface according to the security zones.

12. The system of claim 11, wherein the work orders are injected using a stream identifier that identifies the corresponding GPU programming interface.

13. The system of claim 10, wherein the separate memory regions are allocated by a secure memory management unit.

14. The system of claim 13, wherein one or more of the separate memory regions comprise an isolated address space with hardware-enforced protections using an associated context bank in the secure memory management unit.

15. The system of claim 14, wherein the isolated address space is implemented via one or more of: a hypervisor software layer to manage two or more operating systems; and separation between trusted hardware and untrusted hardware.

16. The system of claim 10, wherein two or more of the security zones are managed in parallel.

17. The system of claim 10, wherein one or more of the security zones comprises a non-secure zone or a secure zone.

18. The system of claim 10, wherein the one or more applications issuing the work orders comprise one or more of a content protection zone application, a content protection zone kernel associated with an operating system, a high level operating system kernel, and a trusted zone security monitor.

19. A computer program for providing secure access control to a graphics processing unit, the computer program embodied in a non-transitory, tangible computer-readable medium containing computer readable program code for execution by a processor, the computer readable program code comprising logic configured to:
    define a plurality of security zones for controlling access to a graphics processing unit (GPU) over a common communication channel, the GPU comprising a plurality of GPU programming interfaces;
    assign each of the security zones to a corresponding one of the plurality of GPU programming interfaces of the GPU, each of the GPU programming interfaces having a separate content queue;
    send a communication over the common communication channel from a central processing unit (CPU) to the GPU;
    receive at a content queue of one of the plurality of GPU programming interfaces the communication from the CPU, the communication comprising work orders issued by one or more applications associated with the corresponding security zone, the work orders comprising instructions to be executed by the GPU;

select the work orders received by the content queue of the one of the plurality of GPU programming interfaces for execution; and control execution of the work orders using separate secure memory regions, each secure memory region allocated to one of the security zones and one of the plurality of GPU programming interfaces.

20. The computer program of claim 19, wherein the work orders are injected by the CPU into the corresponding GPU programming interface according to the security zones.

21. The computer program of claim 20, wherein the work orders are injected using a stream identifier that identifies the corresponding GPU programming interface.

22. The computer program of claim 19, wherein the separate memory regions are allocated by a secure memory management unit.

23. The computer program of claim 22, wherein one or more of the separate memory regions comprise an isolated address space with hardware-enforced protections using an associated context bank in the secure memory management unit.

24. The computer program of claim 23, wherein the isolated address space is implemented via one or more of: a hypervisor software layer to manage two or more operating systems; and separation between trusted hardware and untrusted hardware.

25. The computer program of claim 19, wherein two or more of the security zones are managed in parallel.

26. The computer program of claim 19, wherein one or more of the security zones comprises a non-secure zone or a secure zone.

27. The computer program of claim 19, wherein the one or more applications issuing the work orders comprise one or more of a content protection zone application, a content protection zone kernel associated with an operating system, a high level operating system kernel, and a trusted zone security monitor.

28. A system for providing secure access control to a graphics processing unit, the system comprising:

a central processing unit (CPU) configured to send communications over a common communication channel, and a graphics processing unit (GPU) in communication with the CPU, the GPU comprising:

a plurality of GPU programming interfaces, each GPU programming interface dynamically assigned to a different one of a plurality of security zones and each GPU programming interface having a separate content queue configured to receive work orders for the GPU programming interface over the common communication channel from the CPU, the work orders issued by one or more applications associated with the corresponding security zone, the work orders comprising instructions to be executed by the GPU, and a command processor in communication with the plurality of GPU programming interfaces, the command processor configured to select the work orders received over the common communication channel by the content queues and control execution of the work orders using separate secure memory regions, each secure memory region allocated to one of the security zones and one of the plurality of GPU programming interfaces.

29. The system of claim 28, wherein the work orders are injected by the CPU into the corresponding GPU programming interface according to the security zones.

30. The system of claim 29, wherein the work orders are injected using a stream identifier that identifies the corresponding GPU programming interface.

31. The system of claim 28, wherein the separate memory regions are allocated by a secure memory management unit.

32. The system of claim 31, wherein one or more of the separate memory regions comprise an isolated address space with hardware-enforced protections using an associated context bank in the secure memory management unit.

33. The system of claim 32, wherein the isolated address space is implemented via one or more of: a hypervisor software layer to manage two or more operating systems; and separation between trusted hardware and untrusted hardware.

34. The system of claim 28, wherein two or more of the security zones are managed in parallel.

35. The system of claim 28, wherein one or more of the security zones comprises a non-secure zone or a secure zone.

36. The system of claim 28, wherein the one or more applications issuing the work orders comprise one or more of a content protection zone application, a content protection zone kernel associated with an operating system, a high level operating system kernel, and a trusted zone security monitor.

* * * * *